United States Patent
Yan et al.

(10) Patent No.: US 7,291,419 B2
(45) Date of Patent: Nov. 6, 2007

(54) DURABLE MEMBRANE ELECTRODE ASSEMBLY CATALYST COATED DIFFUSION MEDIA WITH NO LAMINATION TO MEMBRANE

(75) Inventors: Susan G. Yan, Fairport, NY (US); Bhaskar Sompalli, Rochester, NY (US); John C. Doyle, Bergen, NY (US)

(73) Assignee: General Motors Corporation, Detroit, MI (US)

( * ) Notice: Subject to any disclaimer, the term of this patent is extended or adjusted under 35 U.S.C. 154(b) by 278 days.

(21) Appl. No.: 10/763,514

(22) Filed: Jan. 22, 2004

(65) Prior Publication Data

US 2005/0164072 A1    Jul. 28, 2005

(51) Int. Cl.
*H01M 8/10* (2006.01)
(52) U.S. Cl. ............... 429/41; 427/115; 502/101
(58) Field of Classification Search ........... 429/30, 429/36, 29
See application file for complete search history.

(56) References Cited

U.S. PATENT DOCUMENTS

| | | | |
|---|---|---|---|
| 5,234,777 A | | 8/1993 | Wilson |
| 5,318,863 A | * | 6/1994 | Dhar ............... 429/30 |
| 5,521,020 A | * | 5/1996 | Dhar ............... 429/42 |
| 6,444,341 B1 | * | 9/2002 | Yen et al. ........... 429/30 |
| 6,524,736 B1 | | 2/2003 | Sompalli et al. |
| 6,893,763 B2 | * | 5/2005 | Fan et al. ........... 429/33 |

FOREIGN PATENT DOCUMENTS

EP    0 577 291 B1    4/1998

* cited by examiner

*Primary Examiner*—Susy Tsang-Foster
*Assistant Examiner*—Ben Lewis

(57) ABSTRACT

A technique for fabricating an MEA for a fuel cell that is prepared as a catalyst-coated diffusion media (CCDM). The MEA includes a diffusion media layer having a microporous layer. A catalyst layer is deposited on the microporous layer so that it covers its entire surface. An ionomer layer is sprayed on the catalyst layer. A perfluorinated membrane is sandwiched between one CCDM at the anode side of the MEA and another CCDM at the cathode side of the MEA where the ionomer spray layers face the membrane.

4 Claims, 1 Drawing Sheet

DURABLE MEMBRANE ELECTRODE ASSEMBLY CATALYST COATED DIFFUSION MEDIA WITH NO LAMINATION TO MEMBRANE

BACKGROUND OF THE INVENTION

1. Field of the Invention

This invention relates generally to a membrane electrode assembly (MEA) for a proton exchange membrane fuel cell and, more particularly, to an MEA for a proton exchange membrane fuel cell, where the anode and cathode catalyst layers are deposited on a diffusion media layer and then over-sprayed with an ionomer layer, and where the catalyst layer is about the same size as the diffusion media layer.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is disassociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus, are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and the cathode typically include finely divided catalytic particles, usually platinum (Pt), supported on carbon particles and mixed with an ionomer and a solvent. The combination of the anode, cathode and membrane define a membrane electrode assembly (MEA). A stack of the MEAs make up the PEMFC. MEAs are relatively expensive to manufacture and require certain conditions for effective operation. These conditions include proper water management and humidification, and control of catalyst poisoning constituents, such as carbon monoxide (CO).

It is known in the MEA art to coat the catalyst layer on the polymer electrolyte membrane. The catalyst layer may be deposited directly on the membrane, or indirectly applied to the membrane by first coating the catalyst on a decal substrate. Typically the catalyst is coated on the decal substrate as a slurry by a rolling process. The catalyst is then transferred to the membrane by a hot-pressing step. This type of MEA fabrication process is sometimes referred to as a catalyst coated membrane (CCM).

After the catalyst is coated on the decal substrate, an ionomer layer is sometimes sprayed over the catalyst layer before it is transferred to the membrane. Because both the catalyst and the membrane include the ionomer, the ionomer spray layer provides a better contact between the catalyst and the membrane, because it decreases the contact resistance between the catalyst and the membrane. This increases the proton exchange between the membrane and the catalyst, and thus, increases fuel cell performance. U.S. Pat. No. 6,524,736 issued to Sompalli et al., and assigned to the assignee of this invention, discloses a technique for making an MEA in this manner.

The decal substrate can be a porous expanded polytetrafluoroethylene (ePTFE) decal substrate. However, the ePTFE substrate is expensive and not reusable. Particularly, when the catalyst is transferred to the membrane on the ePTFE substrate, a certain portion of the catalyst or catalyst components remain on the ePTFE substrate. Additionally, the ePTFE substrate stretches, deforms and absorbs solvents making a cleaning step very difficult. Hence, every ePTFE substrate used to make each anode and cathode is discarded.

The decal substrate can also be a non-porous ethylene tetrafluoroethylene (ETFE) decal substrate. The ETFE decal substrate provides minimal loss of catalyst and ionomer to the substrate because virtually all of the coating is decal transferred. The substrate does not deform and can be reused. For both of these processes, the anode and cathode decal substrates are cut to the dimensions of the final electrode size, then hot-pressed to the perfluorinated membrane, and subsequently, the decal substrate is pealed off.

MEAs prepared by the above described decal substrate transfer processes have exhibited failure along the catalyst edge. Particularly, the membrane has been shown to tear adjacent to the outer edge of the catalyst layers on both the anode and cathode side of the MEA. This failure typically corresponds to the edge of the decal substrate during the hot-pressing step. Because the decal substrates are smaller in area than the membranes and have a thickness of about 3 mm, the decal substrate or active area section of the membrane would experience higher pressures than the remaining bare membrane areas during the hot-pressing step. This translates to a possible weakening of the membrane along the catalyst edges.

In another known fabrication technique, the MEA is prepared as a catalyst-coated diffusion media (CCDM) instead of a CCM. The diffusion media is a porous layer that is necessary for gas and water transport through the MEA. The diffusion media is typically a carbon paper substrate that is coated with a microporous layer, where the microporous layer is a mixture of carbon and Teflon. A catalyst ink is typically patched coated by a screen printing process on top of the microporous layer, and then compressed. A piece of bare perfluorinated membrane is sandwiched between two pieces of the CCDM with the catalyst sides facing the membrane, and then hot-pressed to bond the CCDM to the membrane.

However, this MEA fabrication process also suffers from membrane failure proximate the edge of the catalyst layer. Additionally, because the catalyst layer is smaller in area than the diffusion media and the membrane, there are areas where the diffusion media directly contacts the membrane outside of the catalyst layer. Therefore, gases being transported through the diffusion media react directly with the membrane instead of the catalyst, possibly causing combustion as a result of the interaction of hydrogen and oxygen, which also may damage the membrane.

Also, in the CCDM process, the ionomer in the catalyst tends to be adsorbed into the diffusion media because of its porosity resulting in less ionomer that is available to electrically couple the catalyst layer to the membrane when the CCDM is hot pressed to the membrane. Therefore, there is a reduction in MEA peformance.

In order to achieve low cost, efficient and durable fuel cells, the fabrication process of the known MEAs needs to be improved. The present invention provides a technique for fabricating MEAs that is simplified, and results in a more durable MEA than those MEAs known in the art.

SUMMARY OF THE INVENTION

In accordance with the teachings of the present invention, a technique for fabricating an MEA for a fuel cell is disclosed, where the MEA is prepared as a CCDM. The MEA includes a diffusion media layer having a microporous layer. A catalyst layer is deposited on the microporous layer so that it covers its entire surface. An ionomer layer is then sprayed on the catalyst layer. A perfluorinated membrane is sandwiched between one CCDM on the anode side of the MEA and another CCDM on the cathode side of the MEA where the catalyst layers face the membrane. The operation of the fuel cell causes the CCDMs to adhere to the membrane.

Additional advantages and features of the present invention will become apparent from the following description and appended claims, taken in conjunction with the accompanying drawings.

DETAILED DESCRIPTION OF THE INVENTION

The following discussion of the embodiments of the invention directed to a technique for fabricating an MEA for a PEMFC is merely exemplary in nature, and is in no way intended to limit the invention or its applications or uses.

Figure 1:
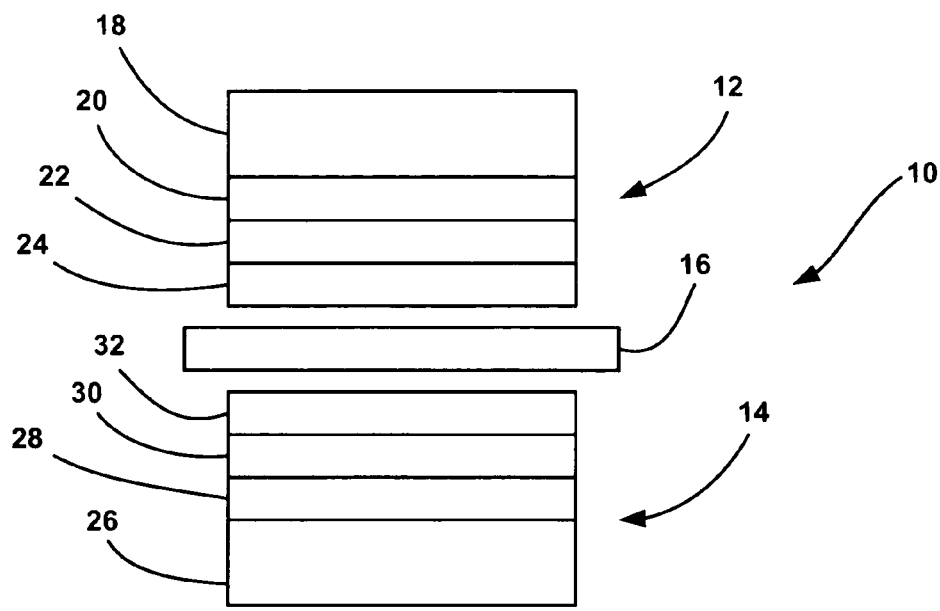
FIG. 1 is a cross-sectional plan view of an MEA, according to an embodiment of the present invention.

FIG. 1 is a cross-sectional plan view of an MEA 10 that has been fabricated by a process of the present invention. The MEA 10 includes an anode side 12 and a cathode side 14. A thin polymer electrolyte proton conducting membrane 16, such as a perfluorinated membrane, is sandwiched between the cathode side 12 and the anode side 14. The anode side 12 includes a diffusion media layer 18, a microporous layer 20, a catalyst layer 22 and an ionomer spray layer 24. The catalyst layer 22 is deposited on the microporous layer 20, and the ionomer layer 24 faces the membrane 16. Likewise, the cathode side 14 includes a diffusion media layer 26, a microporous layer 28, a catalyst layer 30 and an ionomer spray layer 32. The catalyst layer 30 is deposited on the microporous layer 28 and the ionomer spray layer 32 faces the membrane 16. As is known in the art, the diffusion media layers 18 and 26 provide gas transport to the catalyst layers 22 and 30, respectively, and the microporous layers 20 and 28 are hydrophobic layers that wick water away from the membrane 16.

The catalyst layers 22 and 30 will typically include carbon particles having platinum particles adhered thereto. An anode input fuel, such as a hydrogen gas, is applied to the diffusion media layer 18 from suitable flow fields (not shown) and a cathode input gas, such as air, is applied to the diffusion media layer 26 from suitable flow fields (not shown). The catalyst disassociates the hydrogen protons and electrons from the hydrogen fuel in the anode 14 and combines the electrons, hydrogen protons and oxygen in the cathode 12 to generate water. The anode and cathode catalysts can be identical to provide this chemical operation. The MEA 10 would typically be part of a stack of MEAs defining a fuel cell, such as a PEMFC, to provide the desired power output.

In one embodiment, the diffusion media layers 18 and 26 are a carbon paper substrate, however, any suitable diffusion media can be employed. The microporous layers 20 and 28 can be any material suitable for the purposes described herein, such as a carbon and Teflon mixture. The catalyst layers 22 and 30 are coated on the microporous layers 20 and 28, respectively, by any suitable process that forms the catalyst layers 22 and 30 to the desired thickness. For example, the catalyst layers 22 and 30 can be rolled or painted on the microporous layers 20 and 28, respectively, as a slurry. The ionomer layers 24 and 32 are sprayed on the catalyst layers 22 and 30, respectively. The CCDMs may be used as is, or may be furthered annealed by heating the CCDM in a convection oven at 130° C.-160° C. for approximately one hour. The annealing process may stabilize the electrodes to minimize electrode (catalyst layer) degradation during long term fuel cell running.

In one embodiment, the ionomer spray that forms the layers 24 and 32 is a mixture of an ionomer and a methanol, however, other ionomer sprays may be equally suitable. The ionomer layers 24 and 32 provide good ionomer contact between the catalyst layers 22 and 30 and the membrane 16, so that ionomer solution in the catalyst layers 22 and 30 that may diffuse into the diffusion media layers 18 and 26, respectively, does not significantly degrade the MEAs performance.

During MEA assembly, the diffusion layers 18 and 26 and the catalysts layers 22 and 30 with the ionomer spray layers 24 and 32 are positioned adjacent to the membrane 16. During fuel cell operation at a typical temperature of about 80° C., the catalyst layers 22 and 30, the microporous layers 20 and 28, and the diffusion media layers 18 and 26 will completely transfer onto the membrane 16, providing essentially a CCM MEA. In this process, there is no hot-pressing step that would press the catalyst layers 22 and 30 to the membrane 16, which could damage the membrane 16.

Additionally, the size of the catalyst layers 22 and 30 is about the same size as the diffusion media layers 18 and 26, respectively, so that there is no area where hydrogen and air from the diffusion media layers 18 and 26 can interact with the membrane 16 without going through the catalyst layers 22 and 30. This prevents combustion in the membrane 16 that may damage it.

Figure 2:
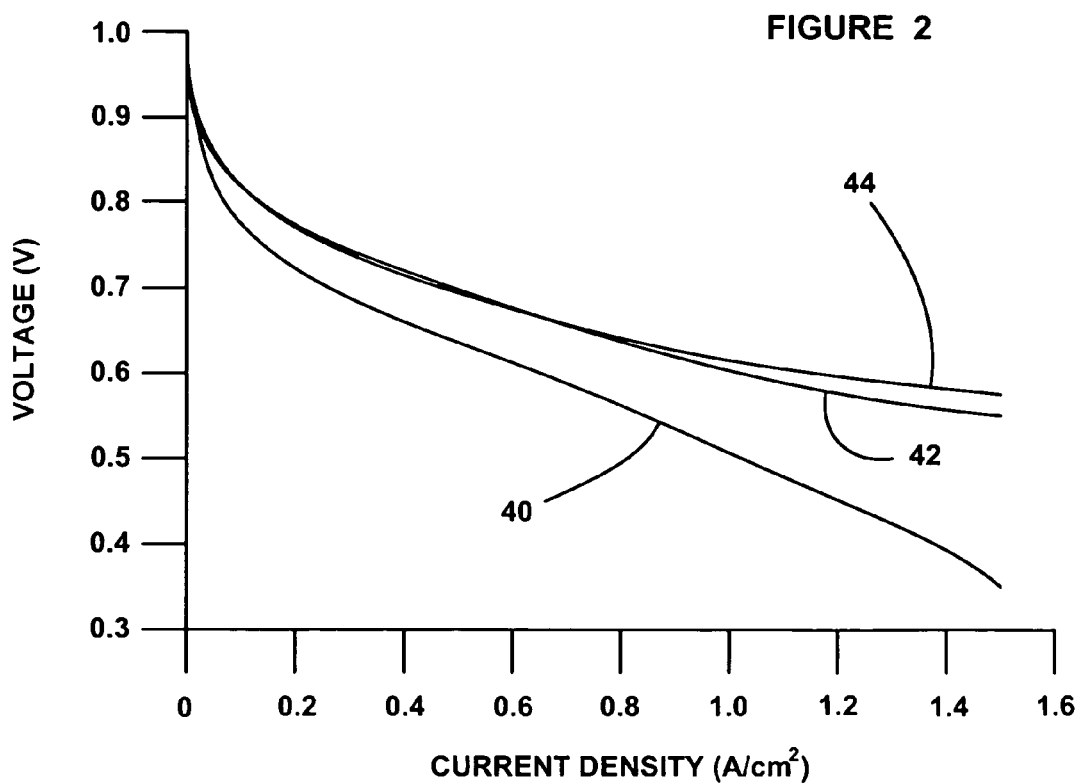
FIG. 2 is a graph with current density on the horizontal axis and voltage on the vertical axis showing polarization curves comparing a CCDM MEA with and without an ionomer over-spray with no lamination to membrane and a known CCM MEA.

FIG. 2 is a graph with current density on the horizontal axis and voltage on the vertical axis showing polarization curves for three MEAs each having an anode temperature of 80° C., a cathode temperature of 64° C., a cell temperature of 80° C., 150 kPa, 2/2 $H_2$/air stoic, a membrane thickness of 25 μm and anode/cathode catalyst loading of 0.4 mgPt/$cm^2$/0.4 mgPt/$cm^2$. Graph line 40 is the polarization curve for a CCDM MEA without an ionomer over-spray and without a hot-press lamination to membrane. Graph line 42 is the polarization curve for a CCDM MEA with an ionomer over-spray and without a hot-press lamination to membrane. Graph line 44 is the polarization curve for a standard CCM MEA.

An MEA prepared as a CCDM MEA without a hot-pressing step of the invention exhibits five times the lifetime and two orders of magnitude lower fluoride ion release rate than that of a CCM MEA and a CCDM MEA prepared with a hot-pressing step. A standard CCM MEA tested in the 50 $cm^2$ platform lasted 65 hours before developing severe failures along the catalyst layer edges. The MEA degradation is usually monitored by fluoride elution in the product water. For the standard CCM MEA tested, the fluoride loss was $7\times10^{-7}$ g/cm$^2$/hr. Under similar circumstances, an MEA with catalyst-coated diffusion media architecture has a much lower fluoride loss of $5\times10^{-9}$ g/cm$^2$/hr with a longer lifetime of 350 hours. Short stack runs under similar conditions had similar lifetimes and fluoride release rates.

Bare membrane exposure to reacting gases leads not only to severe mechanical problems, such as shortening of membranes, but also to increases in the oxygen crossover from cathode to anode. Hydrogen peroxide suspected to form on the anode side due to such crossover attacks the ionomer in the membrane and the electrode leading to severe chemical degradation of the MEA. Coating the diffusion media layers with the catalyst layers eliminates any bare membrane exposure, cutting down peroxide formation, and thus, reducing chemical degradation.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for making a membrane electrode assembly (MEA) for a fuel cell, said method comprising:
   providing a cathode side diffusion media layer;
   depositing a cathode side catalyst layer on the cathode side diffusion media layer;
   spraying an ionomer layer on the cathode side catalyst layer;
   providing an anode side diffusion media layer;
   depositing an anode side catalyst layer on the anode side diffusion media layer;
   spraying an ionomer layer on the anode side catalyst layer;
   positioning the diffusion media layers at opposite sides of a membrane so that the ionomer layers faces the membrane; and
   sandwiching the membrane between said ionomer coated diffusion media layers and incorporating the diffusion media layers and membrane into the fuel cell without heat-pressing said ionomer coated diffusion media layers to the membrane.

2. The method according to claim 1 wherein depositing the catalyst layers on the diffusion media layers includes depositing the catalyst layers so that they are about the same size as the diffusion media layers.

3. The method according to claim 1 further comprising providing a microporous layer as part of the diffusion media layers, where the catalyst layers are deposited on the microporous layer.

4. The method according to claim 1 wherein the membrane is a perfluorinated membrane.

* * * * *